(12) United States Patent
Zhang

(10) Patent No.: US 10,769,196 B2
(45) Date of Patent: Sep. 8, 2020

(54) METHOD AND APPARATUS FOR DISPLAYING ELECTRONIC PHOTO, AND MOBILE DEVICE

(71) Applicant: HUAWEI TECHNOLOGIES CO., LTD., Shenzhen, Guangdong (CN)

(72) Inventor: Yuanrong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/562,090

(22) PCT Filed: Mar. 27, 2015

(86) PCT No.: PCT/CN2015/075280
§ 371 (c)(1),
(2) Date: Sep. 27, 2017

(87) PCT Pub. No.: WO2016/154814
PCT Pub. Date: Oct. 6, 2016

(65) Prior Publication Data
US 2018/0075066 A1    Mar. 15, 2018

(51) Int. Cl.
*G06F 17/00* (2019.01)
*G06Q 50/00* (2012.01)
(Continued)

(52) U.S. Cl.
CPC ......... *G06F 16/58* (2019.01); *G06F 3/0488* (2013.01); *G06F 16/10* (2019.01); *G06F 16/23* (2019.01); *G06Q 50/01* (2013.01); *G06T 7/70* (2017.01)

(58) Field of Classification Search
CPC .......... G06F 16/58; G06F 16/23; G06F 16/10; G06F 3/0488; G06Q 50/01; G06T 7/70
See application file for complete search history.

(56) References Cited

U.S. PATENT DOCUMENTS

| 5,572,651 A | 11/1996 | Weber et al. |
| 6,931,147 B2* | 8/2005 | Colmenarez ....... H04N 1/00127 382/118 |

(Continued)

FOREIGN PATENT DOCUMENTS

| CN | 101635902 | 1/2010 |
| CN | 102693088 | 9/2012 |

(Continued)

OTHER PUBLICATIONS

Notice of Reason(s) for Rejection, dated Aug. 28, 2018, in Japanese Application No. 2017550602 (18 pp.).

(Continued)

*Primary Examiner* — Bobbak Safaipour
(74) *Attorney, Agent, or Firm* — Conley Rose P.C.

(57) ABSTRACT

The present invention provides a method and an apparatus for displaying an electronic photo. A key object included in an electronic photo is identified, associated information that matches the key object is integrated, and the associated information is constantly updated, so that information included in the electronic photo is dynamic and fresh, and an amount of the information included in the electronic photo is increased. The method includes: identifying a key object included in the electronic photo, obtaining, for at least one time, associated information that matches the identified key object, and presenting the associated information and the electronic photo when a preset presentation manner is triggered.

20 Claims, 9 Drawing Sheets

(51) Int. Cl.
  *G06T 7/70* (2017.01)
  *G06F 16/58* (2019.01)
  *G06F 16/10* (2019.01)
  *G06F 16/23* (2019.01)
  *G06F 3/0488* (2013.01)

(56) References Cited

U.S. PATENT DOCUMENTS

| | | | |
|---|---|---|---|
| 7,751,597 B2 | 7/2010 | Gabara | |
| 9,501,871 B2* | 11/2016 | Carter | G09G 5/003 |
| 9,576,175 B2* | 2/2017 | Chembula | G06K 9/00 |
| 10,104,345 B2* | 10/2018 | Masood | G06F 16/738 |
| 2002/0163547 A1 | 11/2002 | Abramson et al. | |
| 2010/0021086 A1 | 1/2010 | Wang et al. | |
| 2010/0057875 A1* | 3/2010 | Bychkov | H04W 4/12 |
| | | | 709/206 |
| 2010/0153990 A1 | 6/2010 | Ress et al. | |
| 2011/0243397 A1* | 10/2011 | Watkins | G06F 16/5854 |
| | | | 382/118 |
| 2013/0044959 A1 | 2/2013 | Mitchell et al. | |
| 2013/0328926 A1 | 12/2013 | Kim et al. | |
| 2014/0172881 A1 | 6/2014 | Petrou et al. | |
| 2015/0341590 A1* | 11/2015 | Choe | G06K 9/00 |
| | | | 348/207.1 |
| 2016/0275304 A1* | 9/2016 | Jiang | G06F 21/36 |
| 2018/0349686 A1* | 12/2018 | Bai | A61B 5/0077 |
| 2019/0227634 A1* | 7/2019 | Bostick | G06F 3/0488 |

FOREIGN PATENT DOCUMENTS

| | | |
|---|---|---|
| CN | 102833493 | 12/2012 |
| EP | 2852135 | 3/2015 |
| JP | 2010134952 A | 6/2010 |
| JP | 2011081819 A | 4/2011 |
| JP | 2011164949 A | 8/2011 |
| JP | 2014194810 A | 10/2014 |

OTHER PUBLICATIONS

International Search Report, dated Jan. 4, 2016, in International Application No. PCT/CN2015/075280, pp. 1-4.
International Search Report dated Jan. 4, 2016 in corresponding International Patent Application No. PCT/CN2015/075280.
Extended European Search Report, dated Jan. 17, 2018, in European Application No. 15886801.8 (7 pp.).
Office Action, dated Jan. 2, 2019, in Chinese Application No. 201580019662.6 (8 pp.).

* cited by examiner

METHOD AND APPARATUS FOR DISPLAYING ELECTRONIC PHOTO, AND MOBILE DEVICE

CROSS-REFERENCE TO RELATED APPLICATIONS

This application is a U.S. National Stage Application which claims the benefit under 35 U.S.C. § 371 of International Patent Application No. PCT/CN2015/075280, filed on Mar. 27, 2015, which is hereby incorporated by reference in its entirety.

TECHNICAL FIELD

The present invention relates to a photo processing technology, and in particular, to a method and an apparatus for displaying an electronic photo, and a mobile device.

BACKGROUND

A digital camera and a handheld device (such as a mobile phone or a tablet computer) are popularized because of development of electronic technologies. Because it is convenient to carry such a digital product, and a photo taken by the digital product is of high quality and completely satisfies a life photo-taking requirement, more people use such a device to take an electronic photo, and almost every family has a large quantity of electronic photos.

However, currently, an electronic photo generally includes a fixed amount of information that cannot be synchronized, and relatively single information is presented. For example, information included in an electronic photo generally includes only a taking time, a taking location background, and a figure. Each time a user views the electronic photo, the user can see only the fixed information.

SUMMARY

The present invention provides a method and apparatus for displaying an electronic photo, and a mobile device, so as to resolve problems that a current electronic photo includes a fixed amount of information and fixed and single information is presented.

According to a first aspect, the present invention provides a method for displaying an electronic photo, including:
  identifying a key object included in the electronic photo;
  obtaining, for at least one time, associated information that matches the identified key object; and
  presenting the associated information and the electronic photo when a preset presentation manner is triggered.

With reference to the first aspect, in a first possible implementation manner of the first aspect, the obtaining, for at least one time, associated information that matches the identified key object includes:
  when a specified period elapses, obtaining the associated information that matches the identified key object; or
  when an instruction used to instruct to obtain the associated information that matches the identified key object is detected, obtaining the associated information that matches the identified key object; or
  when an instruction for viewing the electronic photo is detected, obtaining the associated information that matches the identified key object.

With reference to the first aspect or the first possible implementation manner of the first aspect, in a second possible implementation manner of the first aspect, the obtaining associated information that matches the identified key object includes:
  searching, for an electronic photo that includes the key object, electronic photos provided by the mobile device; and/or
  searching, for contact information of a contact whose contact profile picture matches the key object, an address book provided by a mobile device; and/or
  searching, based on found contact information and for contact status information that matches the contact information, a contact list in a third-party social application program provided by a mobile device; and/or
  searching, for contact status information corresponding to a contact profile picture that matches the key object, contact profile pictures in a third-party social application program provided by a mobile device; and/or
  identifying key information included in the key object, and searching, for a file that matches the key information, files provided by a mobile device; and/or
  identifying key information included in the key object, and searching, for information that matches the key information, a third-party unsocial application program provided by a mobile device; and/or
  identifying key information included in the key object, and invoking an Internet interface to search the Internet for information that matches the key information.

With reference to any one of the first aspect, or the first to the second possible implementation manners of the first aspect, in a third possible implementation manner of the first aspect, a type of the associated information includes at least one of the following types:
  audio, a video, a picture, a text, an audio link, a video link, a picture link, a text link, an application program link, or a device action, where
  the device action includes at least one of the following: vibration, screen off/on, or flashing.

With reference to any one of the first aspect, or the first to the third possible implementation manners of the first aspect, in a fourth possible implementation manner of the first aspect, after the identifying a key object included in the electronic photo, the method further includes:
  classifying an area in which an identified first key object included in the electronic photo is located as a first hotspot area;
  marking a position of the first hotspot area in the electronic photo, to obtain position information corresponding to the first hotspot area;
  establishing, for the identified first key object, a mapping relationship between the position information of the first hotspot area and associated information that is of the first key object and that is obtained at a current time; and
  saving, in an associative manner, the electronic photo and the mapping relationship that is established for the first key object; and
  the presenting the associated information and the electronic photo includes:
  presenting the electronic photo;
  obtaining the position information of the first key object when it is detected that the first key object included in the presented electronic photo is tapped;
  searching the stored mapping relationship for the associated information corresponding to the obtained position information; and
  presenting the found associated information in a designated position in the electronic photo.

With reference to any one of the first aspect, or the first to the fourth possible implementation manners of the first aspect, in a filth possible implementation manner of the first aspect, the presenting the associated information and the electronic photo includes:

presenting link information of the associated information in a designated position in the electronic photo, and when it is detected that the link information is tapped, setting a window, embedding the associated information in the window, and presenting, in the electronic photo, the window in which the associated information is embedded; and/or presenting link information of the associated information in a designated position in the electronic photo, and when it is detected that the link information is tapped, jumping to an application program that provides the associated information; and/or embedding the associated information in the electronic photo for presentation; and/or presenting the associated information in a background of the mobile device.

With reference to any one of the first aspect, or the first to the fifth possible implementation manners of the first aspect, in a sixth possible implementation manner of the first aspect, the preset presentation manner includes one or a combination of the following manners:

receiving an instruction for viewing the electronic photo; or detecting an instruction for tapping a hotspot area in which the identified key object is located.

With reference to any one of the first aspect, or the first to the sixth possible implementation manners of the first aspect, in a seventh possible implementation manner of the first aspect, before the obtaining associated information that matches the identified key object, the method further includes:

obtaining environment information of an environment in which the electronic photo is taken; and the obtaining associated information that matches the identified key object includes:

obtaining the associated information that matches both the identified key object and the environment information.

With reference to the seventh possible implementation manner of the first aspect, in an eighth possible implementation manner of the first aspect, the method further includes:

presenting the obtained environment information in the electronic photo.

With reference to any one of the first aspect, or the first to the eighth possible implementation manners of the first aspect, in a ninth possible implementation manner of the first aspect, the key object includes at least one of the following objects:

a face, an animal, a building, or an article.

According to a second aspect, the present invention provides an apparatus for displaying an electronic photo, including:

an identification unit, configured to identify a key object included in the electronic photo;

an obtaining unit, configured to obtain, for at least one time, associated information that matches the identified key object; and a presentation unit, configured to present the associated information and the electronic photo when a preset presentation manner is triggered.

With reference to the second aspect, in a first possible implementation manner of the second aspect, the obtaining unit is specifically configured to:

when a specified period elapses, obtain the associated information that matches the identified key object; or when an instruction used to instruct to obtain the associated information that matches the identified key object is detected, obtain the associated information that matches the identified key object; or when an instruction for viewing the electronic photo is detected, obtain the associated information that matches the identified key object.

With reference to the second aspect or the first possible implementation manner of the second aspect, in a second possible implementation manner of the second aspect, the obtaining unit is specifically configured to:

search, for an electronic photo that includes the key object, electronic photos provided by a mobile device; and/or search, for contact information of a contact whose contact profile picture matches the key object, an address book provided by a mobile device; and/or search, based on found contact information and for contact status information that matches the contact information, a contact list in a third-party social application program provided by a mobile device; and/or search, for contact status information corresponding to a contact profile picture that matches the key object, contact profile pictures in a third-party social application program provided by a mobile device; and/or identify key information included in the key object, and search, for a file that matches the key information, files provided by a mobile device; and/or identify key information included in the key object, and search, for information that matches the key information, a third-party unsocial application program provided by a mobile device; and/or identify key information included in the key object, and invoke an Internet interface to search the Internet for information that matches the key information.

With reference to any one of the second aspect, or the first to the second possible implementation manners of the second aspect, in a third possible implementation manner of the second aspect, a type of the associated information includes at least one of the following types:

audio, a video, a picture, a text, an audio link, a video link, a picture link, a text link, an application program link, or a device action, where the device action includes at least one of the following: vibration, screen off/on, or flashing.

With reference to any one of the second aspect, or the first to the third possible implementation manners of the second aspect, in a fourth possible implementation manner of the second aspect, after identifying the key object included in the electronic photo, the identification unit is further configured to:

classify an area in which an identified first key object included in the electronic photo is located as a first hotspot area;

mark a position of the first hotspot area in the electronic photo, to obtain position information corresponding to the first hotspot area;

establish, for the identified first key object, a mapping relationship between the position information of the first hotspot area and associated information that is of the first key object and that is obtained at a current time; and save, in an associative manner, the electronic photo and the mapping relationship that is established for the first key object; and the presentation unit is specifically configured to:

present the electronic photo;

obtain the position information of the first key object when it is detected that the first key object included in the presented electronic photo is tapped search the stored mapping relationship for the associated information corresponding to the obtained position information; and present the found associated information in a designated position in the electronic photo.

With reference to any one of the second aspect, or the first to the fourth possible implementation manners of the second aspect, in a fifth possible implementation manner of the second aspect, the presentation unit is specifically configured to:

present link information of the associated information in a designated position in the electronic photo, and when it is detected that the link information is tapped, set a window, embed the associated information in the window, and present, in the electronic photo, the window in which the associated information is embedded; and/or present link information of the associated information in a designated position in the electronic photo, and when it is detected that the link information is tapped, jump to an application program that provides the associated information; and/or embed the associated information in the electronic photo for presentation; and/or present the associated information in a background of the mobile device.

With reference to any one of the second aspect, or the first to the fifth possible implementation manners of the second aspect, in a sixth possible implementation manner of the second aspect, the preset presentation manner includes one or a combination of the following manners:

receiving an instruction for viewing the electronic photo; or detecting an instruction for tapping a hotspot area in which the identified key object is located.

With reference to any one of the second aspect, or the first to the sixth possible implementation manners of the second aspect, in a seventh possible implementation manner of the second aspect, before obtaining the associated information that matches the identified key object, the obtaining unit is further configured to:

obtain environment information of an environment in which the electronic photo is taken; and when obtaining the associated information that matches the identified key object, the obtaining unit is specifically configured to:

obtain the associated information that matches both the identified key object and the environment information.

With reference to the seventh possible implementation manner of the second aspect, in an eighth possible implementation manner of the second aspect, the presentation unit is further configured to:

present the obtained environment information in the electronic photo.

According to a third aspect, the present invention provides a mobile device, including:

a display screen, an input device, a memory, and a processor, where the input device, the display screen, the memory, and the processor are connected to a bus;

the display screen is configured to display an electronic photo and associated information;

the input device is configured to detect an input instruction of a user;

the memory is configured to store a group of program code, the electronic photo, and the associated information; and the processor is configured to invoke the program code stored in the memory, to perform the following operations: identifying a key object included in the electronic photo; obtaining, for at least one time, associated information that matches the identified key object; and presenting the associated information and the electronic photo when a preset presentation manner is triggered.

With reference to the third aspect, in a first possible implementation manner of the third aspect, the processor is specifically configured to:

when a specified period elapses, obtain the associated information that matches the identified key object; or when an instruction used to instruct to obtain the associated information that matches the identified key object is detected, obtain the associated information that matches the identified key object; or when an instruction for viewing the electronic photo is detected, obtain the associated information that matches the identified key object.

With reference to the third aspect or the first possible implementation manner of the third aspect, in a second possible implementation manner of the third aspect, the processor is specifically configured to:

search, for an electronic photo that includes the key object, electronic photos provided by the mobile device; and/or search, for contact information of a contact whose contact profile picture matches the key object, an address book provided by the mobile device; and/or search, based on found contact information and for contact status information that matches the contact information, a contact list in a third-party social application program provided by the mobile device; and/or search, for contact status information corresponding to a contact profile picture that matches the key object, contact profile pictures in a third-party social application program provided by the mobile device; and/or identify key information included in the key object, and search, for a file that matches the key information, files provided by the mobile device; and/or identify key information included in the key object, and search, for information that matches the key information, a third-party unsocial application program provided by the mobile device; and/or identify key information included in the key object, and invoke an Internet interface to search the Internet for information that matches the key information.

With reference to any one of the third aspect, or the first to the second possible implementation manners of the third aspect, in a third possible implementation manner of the third aspect, a type of the associated information includes at least one of the following types:

audio, a video, a picture, a text, an audio link, a video link, a picture link, a text link, an application program link, or a device action, where the device action includes at least one of the following: vibration, screen off/on, or flashing.

With reference to any one of the third aspect, or the first to the third possible implementation manners of the third aspect, in a fourth possible implementation manner of the third aspect, after identifying the key object included in the electronic photo, the processor is further configured to:

classify an area in which an identified first key object included in the electronic photo is located as a first hotspot area;

mark a position of the first hotspot area in the electronic photo, to obtain position information corresponding to the first hotspot area;

establish, for the identified first key object, a mapping relationship between the position information of the first hotspot area and associated information that is of the first key object and that is obtained at a current time; and save, in an associative manner, the electronic photo and the mapping relationship that is established for the first key object; and when presenting the associated information and the electronic photo, the processor is specifically configured to:
present the electronic photo;
obtain the position information of the first key object when it is detected that the first key object included in the presented electronic photo is tapped;
search the stored mapping relationship for the associated information corresponding to the obtained position information; and
present the found associated information in a designated position in the electronic photo.

With reference to any one of the third aspect, or the first to the fourth possible implementation manners of the third aspect, in a fifth possible implementation manner of the third aspect, when presenting the associated information and the electronic photo, the processor is specifically configured to:

present link information of the associated information in a designated position in the electronic photo, and when it is detected that the link information is tapped, set a window, embed the associated information in the window, and present, in the electronic photo, the window in which the associated information is embedded; and/or present link information of the associated information in a designated position in the electronic photo, and when it is detected that the link information is tapped, jump to an application program that provides the associated information; and/or embed the associated information in the electronic photo for presentation; and/or present the associated information in a background of the mobile device.

With reference to any one of the third aspect, or the first to the fifth possible implementation manners of the third aspect, in a sixth possible implementation manner of the third aspect, the preset presentation manner includes one or a combination of the following manners:

receiving an instruction for viewing the electronic photo; or detecting an instruction for tapping a hotspot area in which the identified key object is located.

With reference to any one of the third aspect, or the first to the sixth possible implementation manners of the third aspect, in a seventh possible implementation manner of the third aspect, the apparatus further includes:

a sensor, configured to record environment information of an environment in which the electronic photo is taken;

before obtaining the associated information that matches the identified key object, the processor is further configured to:

obtain the environment information of the environment in which the electronic photo is taken; and when obtaining the associated information that matches the identified key object, the processor is specifically configured to:

obtain the associated information that matches both the identified key object and the environment information.

With reference to the seventh possible implementation manner of the third aspect, in an eighth possible implementation manner of the third aspect, the processor is further configured to:

present the obtained environment information in the electronic photo.

According to a fourth aspect, the present invention provides a computer program product used for displaying an electronic photo, the computer program includes a computer-readable medium, and the computer-readable medium includes an instruction that can perform an operation step in any of the first aspect, or the first to the ninth possible implementation manners of the first aspect.

In the solutions provided in the present invention, a key object included in an electronic photo is identified, associated information that matches the key object is integrated, and the associated information is constantly updated, so that information included in the electronic photo is dynamic and fresh, and an amount of the information included in the electronic photo is increased.

DESCRIPTION OF EMBODIMENTS

Embodiments of the present invention provide a method and an apparatus for displaying an electronic photo, and a mobile device. A key object included in an electronic photo is identified, associated information that matches the key object is integrated, and the associated information is constantly updated, so that information included in the electronic photo is dynamic and fresh, and an amount of the information included in the electronic photo is increased.

The following describes the technical solutions of the present invention with reference to the accompanying specification drawings and the embodiments.

Figure 1:
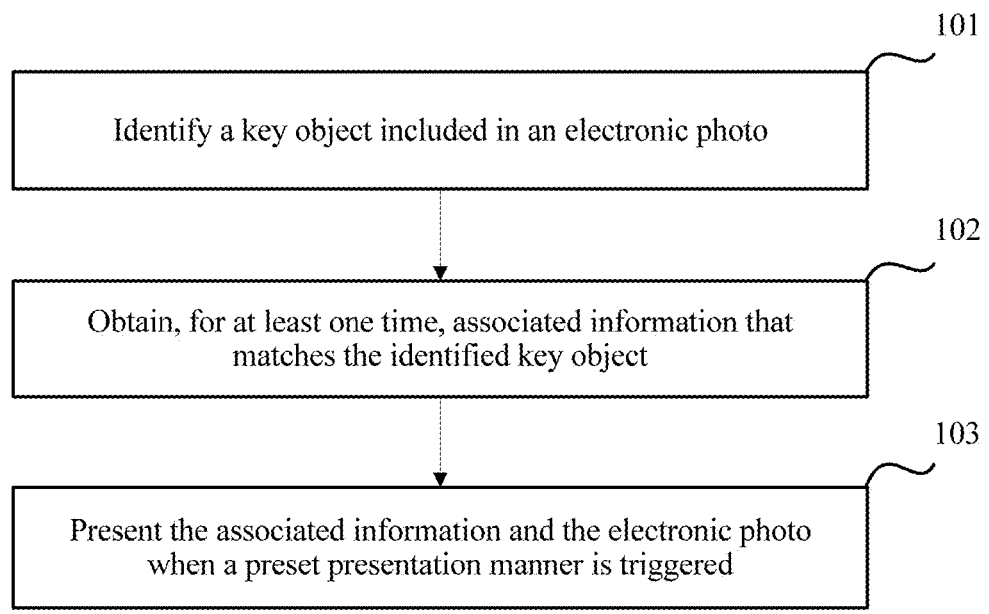
FIG. 1 is a flowchart of a method for displaying an electronic photo according to an embodiment of the present invention.

Referring to FIG. 1, an embodiment of the present invention provides a method for displaying an electronic photo. The method can be used for real-time electronic photo processing when an electronic photo is taken, or may be used for post processing of an electronic photo. An implementation procedure of the method is as follows:

Step 101: Identify a key object included in the electronic photo.

Step 102: Obtain, for at least one time, associated information that matches the identified key object.

Step 103: Present the associated information and the electronic photo when a preset presentation manner is triggered.

The key object is a meaningful entity that is in the electronic photo and can be identified by using an identification technology, and may be at least one of objects such as a face, an animal, a building, or an article. The article herein refers to an item in life and production, such as a mobile phone, a table, or a neon light. The identification technology includes a face identification technology, an article identification technology, and the like. Because the identification technology is a relatively mature technology in the prior art, details are not described in the present invention. The associated information may be information that matches an image feature of the key object, or may be information that includes an implicit feature of the key object and obtained after semantic analysis is performed on the key object.

Optionally, in this embodiment of the present invention, the obtaining associated information that matches the identified key object may be triggered in but is not limited to the following three manners.

Manner 1: When a specified period elapses, obtain the associated information that matches the identified key object.

Manner 1 is a manner of obtaining the associated information at fixed times. The associated information is updated at the specified period, so that relative real-time quality of the associated information and a respond speed in presentation can be ensured.

Manner 2: When an instruction used to instruct to obtain the associated information that matches the identified key object is detected, obtain the associated information that matches the identified key object.

Manner 2 is a manner of obtaining the associated information at unfixed times, and is mainly manually triggered by a user, so that relative real-time quality of the associated information and a respond speed in presentation can be ensured.

Manner 3: When an instruction for viewing the electronic photograph is detected, obtain the associated information that matches the identified key object.

Manner 3 is a manner of obtaining the associated information at unfixed times. That the instruction for viewing the electronic photo is detected is used as a sign for updating the associated information, so that real-time quality of the presented associated information can be ensured.

According to the foregoing three triggering manners, associated information that matches a key object may be synchronized to a server at fixed or unfixed times according to the key object isolated from an electronic photo, so that information included in the electronic photo is dynamic and fresh.

Optionally, in this embodiment of the present invention, the associated information that matches the identified key object may be obtained in but is not limited to one of or any combination of the following manners.

Manner 1: Search, for an electronic photo that includes the key object, electronic photos provided by a mobile device.

Manner 2: Search, for contact information of a contact whose contact profile picture matches the key object, an address book provided by a mobile device.

Manner 3: Search, based on found contact information and for contact status information that matches the contact information, a contact list in a third-party social application program (such as QQ, WeChat, or Weibo) provided by a mobile device.

For example, if contact information of a contact found in the address book provided by the mobile device further records a QQ account of the contact, an application program interface of QQ installed on the mobile device may be invoked to obtain contact status information that matches the QQ account of the foregoing found contact, for example, a QQ signature, mood, a journal, or a photo that is newly released by the contact.

Manner 4: Search, for contact status information corresponding to a contact profile picture that matches the key object, contact profile pictures in a third-party social application program provided by a mobile device.

For example, an application program interface of WeChat installed on the mobile device may be invoked to obtain contact status information corresponding to a WeChat profile picture that matches the identified key object in the electronic photo, for example, Moments information newly released by the contact.

In Manner 3 and Manner 4, after it is identified that the key object is a contact, an activity of the contact at a current time point on each third-party social application program installed on the mobile device may be collected, so as to evaluate mood of the contact; or an activity of the contact on a third-party social application program in a period of time may be obtained; or a current time point is identified, and an activity, mood, or the like of the contact on each third-party social application program at a same time point in each past year may be obtained.

Manner 5: Identify key information included in the key object, and search, for a file that matches the key information, files provided by a mobile device.

The key information herein may be information that can represent a feature of the key object and obtained after semantic analysis is performed on the key object.

For example, when it is identified that a key object in the electronic photo is a building, and it is further identified that the building is the Great Wall, "the Great Wall" may be used as a key word, and the files provided by the mobile device are searched for a file that matches the key word, for example, related audio, a related video, a related text, or the like.

For another example, when a face is identified from the electronic photo, and it is further identified that expression on the face shows happiness, the electronic photo provided by the mobile device may be associated, in an automatic picture identification manner, with an electronic photo that matches the face and in which expression also shows happiness.

Manner 6: Identify key information included in the key object, and search, for information that matches the key information, a third-party unsocial application program (such as a map-type application program or a shopping-type application program) provided by a mobile device.

For example, after it is identified that a key object in the electronic photo is a building, and it is further identified that the building is the Great Wall, "the Great Wall" may be used as position information, and an interface of a map-type application program installed on the mobile device is invoked, to display a related solution for moving from a current position of the mobile device to a position of the Great Wall.

Manner 7: Identify key information included in the key object, and invoke an Internet interface to search the Internet for information that matches the key information.

For example, after it is identified that a key object in the electronic photo is an article, and a name (for example, a vegetable or an electric appliance) of the article is further identified, the name of the article may be used as a key word, and an Internet interface of the mobile device is invoked to find out a latest market price and the like of the article.

A type of the associated information in this embodiment of the present invention may be at least one of the following: audio, a video, a picture, a text, an audio link, a video link, a picture link, a text link, an application program link, or a device action, and the device action may include at least one of the following: vibration, screen off/on, or flashing.

The associated information is generally presented together with the electronic photo when the type of the associated information is audio, a video, a picture, a text, or a device action. For example, when a bar is identified from an electronic photo, a related light effect and a related sound effect may be obtained by means of information integration, and the obtained light effect and the obtained sound effect are presented together with the electronic photo by using an operation such as vibration, flashing, or audio playing.

When the type of the associated information is an audio link, a video link, a photo link, a text link, or an application program link, a corresponding application program interface is generally jumped to after the link is tapped. For example, there is an option "send a QQ message" displayed around a face in the electronic photo. After the option is tapped, a QQ interface is jumped to, so as to chat and interact with a contact corresponding to the face.

Optionally, in this embodiment of the present invention, after the associated information that matches the identified key object is obtained, and before the associated information and the electronic photo are presented, the associated information obtained at a current time and the electronic photo may be saved in an associative manner.

Optionally, the associated information obtained at a current time and the electronic photo may be saved in an associative manner after it is determined that the associated information obtained at the current time is inconsistent with associated information obtained at a previous time. In this way, an amount of stored data can be reduced.

Optionally, after the key object included in the electronic photo is identified, an area in which an identified first key object included in the electronic photo is located may further be classified as a first hotspot area, and a position of the first hotspot area in the electronic photo is marked, to obtain position information corresponding to the first hotspot area. The first key object is any key object in the electronic photo. The first hotspot area is used to represent a position of the first key object in the electronic photo. The position of the first key object may be a set of multiple electronic photo coordinate points, or may be a set of multiple touchscreen coordinate points.

Figure 2:
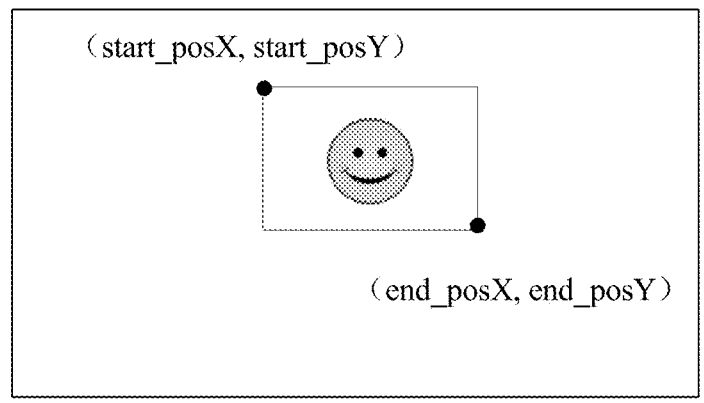
FIG. 2 is a schematic diagram of hotspot area classification according to an embodiment of the present invention.

For example, as shown in FIG. 2, an area in which a face is located is classified as a hotspot area. An upper left horizontal position (start_posX), an upper left vertical position (start_posY), a lower right horizontal position (end_posX), and a lower right vertical position (end_posY) that are of the hotspot area relative to the electronic photo are used as position information corresponding to the hotspot area.

Then, a mapping relationship between the position information of the first hotspot area and associated information that is of the first key object and that is obtained at a current time is established for the identified first key object, and the electronic photo and the mapping relationship that is established for the first key object are saved in an associative manner.

In this way, in subsequent presentation of the associated information and the electronic photo, presentation efficiency and a display effect of the associated information can be improved.

In actual application, effective information included in the electronic photo may be saved in an associative manner by using a database. For example, the following multiple tables from Table 1 to Table 5 may be used to separately store basic information, extended information, and the like that are included in the electronic photo.

TABLE 1

| Basic-information table | | | |
| --- | --- | --- | --- |
| Field name | Field type | Meaning | Example of a field value |
| picId | Long | ID that is of each electronic photo and used to identify a unique electronic photo | 123 |
| pic_content | Byte[ ] | Content that is of an electronic photo and stored in a database in a binary manner | 01 03 0E AB . . . |
| createTime | long | Generation time of the electronic photo | 2015 Jan. 1 10:20 |
| createTemperature | float | Temperature for generating the electronic photo | 23.3 |
| createPosition | String | Longitude and latitude at which the electronic photo is generated | (12.0352, 23.543) |

TABLE 1-continued

Basic-information table

| Field name | Field type | Meaning | Example of a field value |
|---|---|---|---|
| createLocation | String | Geographical location in which the electronic photo is generated | Happy Valley in Wuhan |
| createInfoUrl | String | Url that is most closely associated with the electronic photo and may be matched by a network or may be designated by a user | http://wh.happyvalley.cn/ |

Table 1 is used to define a basic attribute of an electronic photo, for example, environment information such as temperature, longitude and latitude, or a geographical location for generating the electronic photo. In Table 1, there is only one entry for each electronic photo.

TABLE 2

Position information table of a hotspot area

| Field name | Field type | Meaning | Example of a field value |
|---|---|---|---|
| splitId | Long | Serial number of a hotspot area corresponding to a key object in an electronic photo, and serial numbers of hotspot areas in a same electronic photo are not the same | 1 |
| picId | long | ID of the corresponding electronic photo | 123 |
| start_posX | int | Upper left horizontal position of the hotspot area relative to the electronic photo | 230 |
| start_posY | int | Upper left vertical position of the hotspot area relative to the electronic photo | 230 |
| end_posX | int | Lower right horizontal position of the hotspot area relative to the electronic photo | 480 |
| end_posY | int | Lower right vertical position of the hotspot area relative to the electronic photo | 480 |
| keyword | String | Key word of the hotspot area | Zhang San, Lushan, Gate |

TABLE 3

Table of an association relationship with another electronic photo

| Field name | Field type | Meaning | Example of a field value |
|---|---|---|---|
| cur_picId | Long | ID of a corresponding electronic photo | 123 |
| SplitId | int | Serial number of a hotspot area in the electronic photo | 3 |
| ref_picId | Long | ID of an associated electronic photo | 124 |

Table 3 is used to represent an association relationship between electronic photos, for example, an association relationship between electronic photos including a same face. A same cur_picId may correspond to multiple ref_picIds in Table 3, that is, it indicates that there may be multiple electronic photos associated with a same electronic photo.

TABLE 4

Environment information table

| Field name | Field type | Meaning | Example of a field value |
|---|---|---|---|
| _id | Long | Unique value in an environment information record | 123 |
| picId | Long | ID of a corresponding electronic photo | 124 |
| environType | int | Environment information type that may be defined as follows:<br>0: Temperature<br>1: Sound<br>2: Altitude<br>4: Weather | 2 |
| environVal | Byte[ ] | Environment information value, where an upper layer performs corresponding decoding according to an actual type<br>For example, a position value is:<br>01 42 04 11 00 56 02 04<br>A position (142.0411, 56.0204) is obtained after parsing. | 19 00 00 00 21 03 00 00 |

Table 4 is used to record environment information of an environment in which an electronic photo is taken. As shown in Table 5, Table 5 is an example of the environment information table.

TABLE 5

Example of an environment information table

| _id (Serial number of environment information) | _picId (Serial number of a photo) | environType (Information type) | environVal (Information value) |
|---|---|---|---|
| 101 | 1 | 1 (Sound) | "Cheese! Yeah" |
| 102 | 1 | 2 (Altitude) | 10.0 meters |
| 103 | 1 | 3 (Weather) | "Sunny" |

TABLE 6

Associated-information table

| Field name | Field type | Meaning | Example of a field value |
|---|---|---|---|
| _id | Long | Unique value in an environment information record | 123 |

TABLE 6-continued

Associated-information table

| Field name | Field type | Meaning | Example of a field value |
|---|---|---|---|
| pic_id | Long | ID of a corresponding electronic photo | 124 |
| Split_id | int | Serial number of a hotspot area in the electronic photo | 3 |
| sofiwareName | string | Corresponding processing software name | com.baidu.map |
| externInfo | String | Extended information, that is, related information supplentented according to different software | Bus |
| showtype | int | Presentation type: 0: Play (a sound, a background animation, vibration, or the like) at the same time the photo is presented 1: Present a connection entry when the photo is presented, and jump to an information provider program after the connection entry is tapped 2: Present a connection entry when the photo is presented, and display information on the photo after the connection entry is tapped | 0 |
| showMethod | int | Message presentation manner 0: Sound 1: An animation that uses the photo as a background 2: Present a small picture on a picture 4: Vibration 5: Invoke related information of another program | 2 |
| showVal | Byte[ ] | Value of the extended information, where an upper layer performs corresponding decoding according to an actual type For example, when a sound is played, the value is related data of the sound. When the another program is invoked, the value is corresponding invoking method code. | 19 00 00 00 21 03 00 00 |

Table 6 is used to store associated information that is related to an electronic photo and is constantly updated. An information source of the associated information is mainly a third-party application program installed on the mobile device, and the third-party application program may provide the associated information by using a designated interface. As shown in Table 7, Table 7 is an example of the associated-information table.

TABLE 7

Example of an associated-information table

| softwareName | showType | showMethod | show Val |
|---|---|---|---|
| Baidu Map | 1 (Present a connection entry when a photo is presented, and jump to an information provider program after the connection entry is tapped) | 5 (Invoke related information of another program) | Format: {Time, (Longitude, Latitude)} {(2013 Mar. 1, (12.03, 10.25)}, {2013 Apr. 1, (12,04, 15.0)}, {2013 Jun. 7, (11.2, 16 0)}, {2014 May 1, (13.0, 14.01)} . . . } |
| Mood calender | 2 (Present a connection entry when a photo is presented, and display information on the photo after the connection entry is tapped) | 2 (Present a small picture on a picture) | Format: {Time, Signature information} {2013 Mar. 1, "Hangzhou is very beautiful!"} {2013 Apr. 1, "Won money today"} {2013 Jun. 7, "Working overtime, so sad"} . . . } |

In addition to the foregoing method of storing, in the database, both the basic information and the extended information that are included in the electronic photo, content (an original file such as an associated electronic photo, or audio/a video) of the extended information may further be dispersedly stored in folders, and only paths of the folders used for storage and an association relationship are stored in the database. The basic-information table is used as an example, and in such a storage manner, a field and an attribution that are of the basic-information table are shown in Table 8.

TABLE 8

Basic-information table

| Field name | Field type | Meaning | Example of a field value |
| --- | --- | --- | --- |
| _id | Long | ID that is of each electronic photo and used to identify a unique electronic photo. | 123 |
| pic_Path | String | Relative path for storing the electronic photo | Pic/20150101_102030_123.jpg |
| createTime | long | Generation time of the electronic photo | 2015 Jan. 1 10:20 |
| createTemperature | float | Temperature for generating the electronic photo | 23.3 |
| createPosition | String | Longitude and latitude at which the electronic photo is generated | (12.0352; 23.543) |
| createLocation | String | Geographical location in which the electronic photo is generated | Happy Valley in Wuhan |
| createInfoUrl | String | Url that is most closely associated will the electronic photo and may be matched by a network or may be designated by a user | http://wh.happyvalley.cn/ |

In Table 8, an original field pic_content in Table 1 is replaced with pic_path, and only a relative path of the electronic photo is stored in the database.

The preset presentation manner described in step 103 may be receiving an instruction for viewing the electronic photo, and/or detecting an instruction for tapping a hotspot area in which the identified key object is located.

In this embodiment of the present invention, after the preset presentation manner is triggered, the associated information and the electronic photo are mainly presented in the following four manners.

Manner 1: Present link information of the associated information in a designated position in the electronic photo, and when it is detected that the link information is tapped, set a window, embed the associated information in the window, and present, in the electronic photo, the window in which the associated information is embedded.

Manner 2: Present link information of the associated information in a designated position in the electronic photo, and when it is detected that the link information is tapped, jump to an application program that provides the associated information.

Optionally, for the foregoing Manner 1 and Manner 2, the electronic photo may be presented first. Then, when it is detected that any key object included in the presented electronic photo is tapped, position information of the tapped key object is obtained, the stored association relationship is searched for associated information corresponding to the obtained position information, and the found associated information is presented in a designated position in the electronic photo, for example, around the tapped key object, or in an upper left position of the electronic photo.

Figure 3:
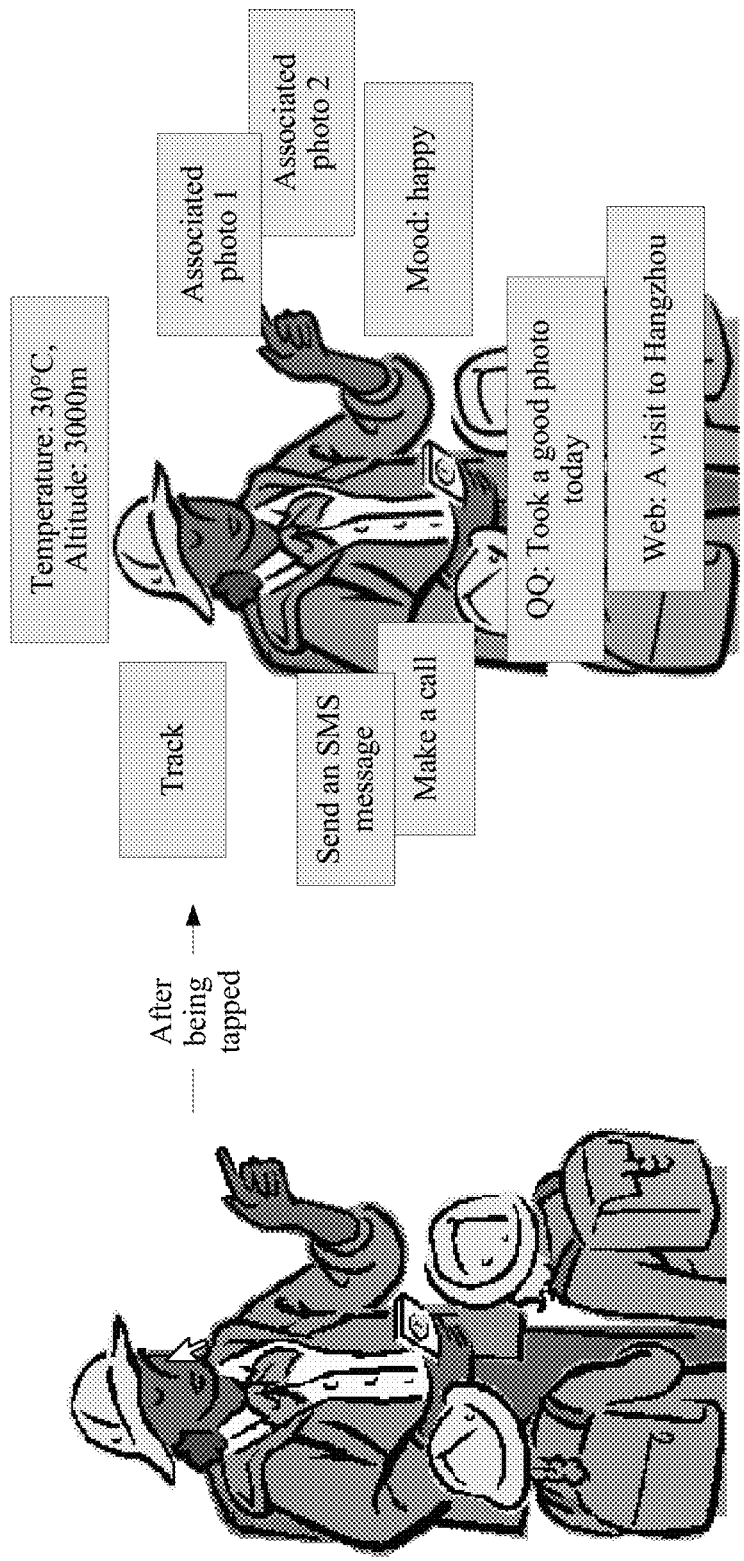
FIG. 3 and FIG. 4 are schematic diagrams of associated information presentation according to an embodiment of the present invention.
Figure 4:
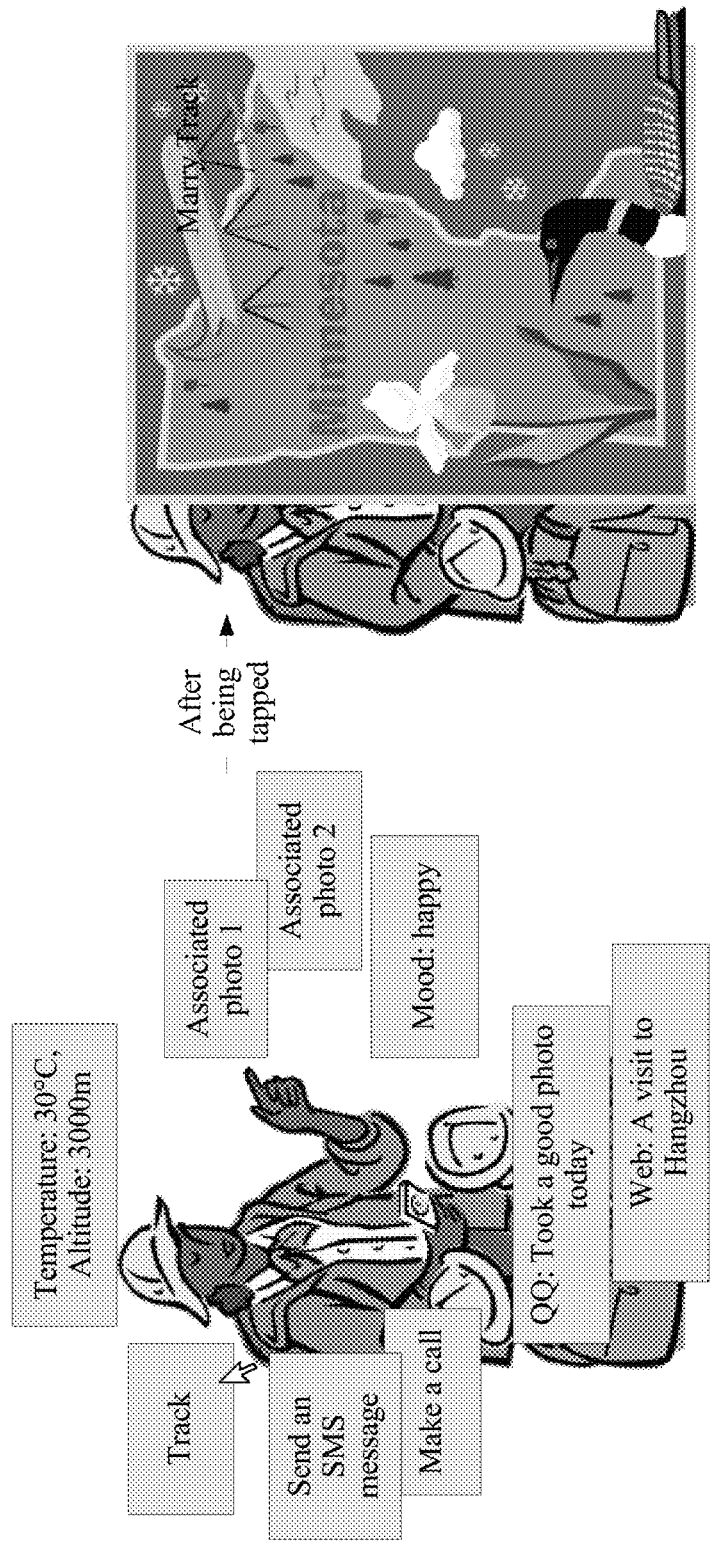

For example, as shown in FIG. 3, when a figure in an electronic photo is tapped, link information of the figure is presented around the figure. When corresponding link information such as a track is tapped, as shown in FIG. 4, a track of the figure is directly displayed on the electronic photo, or corresponding track software is jumped to.

Manner 3: Embed the associated information in the electronic photo for presentation.

Manner 4: Present the associated information in a background of the mobile device.

For example, Manner 3 may be used to embed, in the electronic photo for presentation, an animation effect on the electronic photo. Manner 4 may be used to invoke a related application program to present background music, a device action, or the like in a background.

In actual application, a third-party application program may use one of Manner 1 to Manner 4, or may support multiple manners. For example, the third-party application program supports both Manner 1 and Manner 2. After a figure in the electronic photo is tapped, a QQ signature of the figure is displayed around the figure, and after the QQ signature is tapped, QQ space is jumped to, so as to perform an operation such as leaving a message.

Optionally, environment information of an environment in which the electronic photo is taken may be further obtained before the associated information that matches the identified key object is obtained. Associated information that matches the environment information is obtained at the same time the associated information that matches the identified key object is obtained, and the obtained environment information is presented in the electronic photo. In this way, an amount of information included in the electronic photo can be increased.

Currently, a mobile device generally has a sensor function and a positioning function. The mobile device may obtain the environment information by using a sensor of the mobile device and a positioning technology, or may obtain the environment information by using the Internet. The environment information includes at least one of the following: time, temperature, humidity, light intensity, weather, ultraviolet rays, a pollution degree, longitude and latitude, a geographical location, a sound, or activity content information in taking the electronic photo.

For example, a user takes an electronic photo at a gate of the Happy Valley. When the photo is viewed again after several years, a mobile device may extract environment information included in the electronic photo, for example, longitude and latitude and a geographical location; obtain a latest introduction of the Happy Valley by using an open interface of the Internet according to the extracted environment information, and/or obtain a weather condition of the Happy Valley of a current day by using an interface of a weather system, or the like; compare obtained latest news with stored information; perform adding or replacement according to specific logic, for example, text information for publicity may be directly replaced, and a variable building background picture and a variable weather condition may be added and stored; and when the user taps a landmark building of the Happy Valley, display the newly obtained information.

For another example, if an electronic photo is taken in special weather such as a gale or heavy snow, the electronic photo may be associated with another electronic photo taken in similar weather by a user.

The following describes an implementation procedure of the method for displaying an electronic photo shown in FIG. 1 in detail by using three sequence diagrams.

Figure 5:
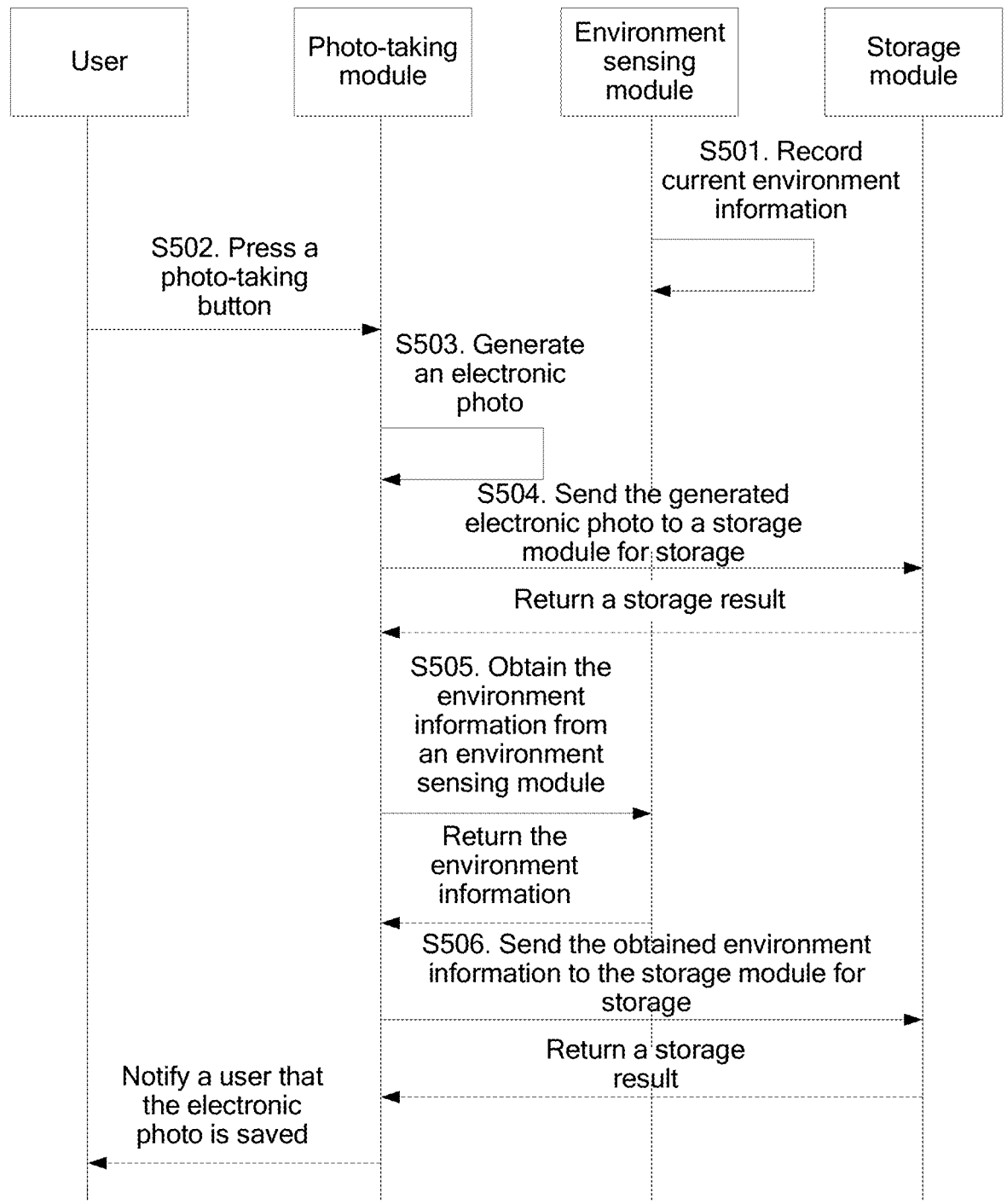
FIG. 5 is a sequence diagram of taking an electronic photo according to an embodiment of the present invention.

FIG. 5 is a sequence diagram of taking an electronic photo, and includes the following steps.

Step 501: An environment sensing module records current environment information.

Step 502: A user presses a photo-taking button.

Step 503: A photo-taking module generates an electronic photo.

Step 504: The photo-taking module sends the generated electronic photo to a storage module for storage.

Optionally, after saving of the electronic photo, the storage module may return a storage result (for example, success or failure) to the photo-taking module.

Step 505: The photo-taking module obtains the environment information from the environment sensing module.

Step 506: The photo-taking module sends the obtained environment information to the storage module for storage.

Optionally, after saving the environment information, the storage module may return a storage result to the photo-taking module, and the photo-taking module notifies the user that the electronic photo has been stored.

The foregoing photo-taking module, environment sensing module, and storage module are configured inside a mobile device. If no environment sensing module is configured in the mobile device, the environment information may not be stored. The foregoing steps of saving the electronic photo and the environment information are not performed sequentially, or the electronic photo and the environment information may be saved at the same time.

Figure 6A:
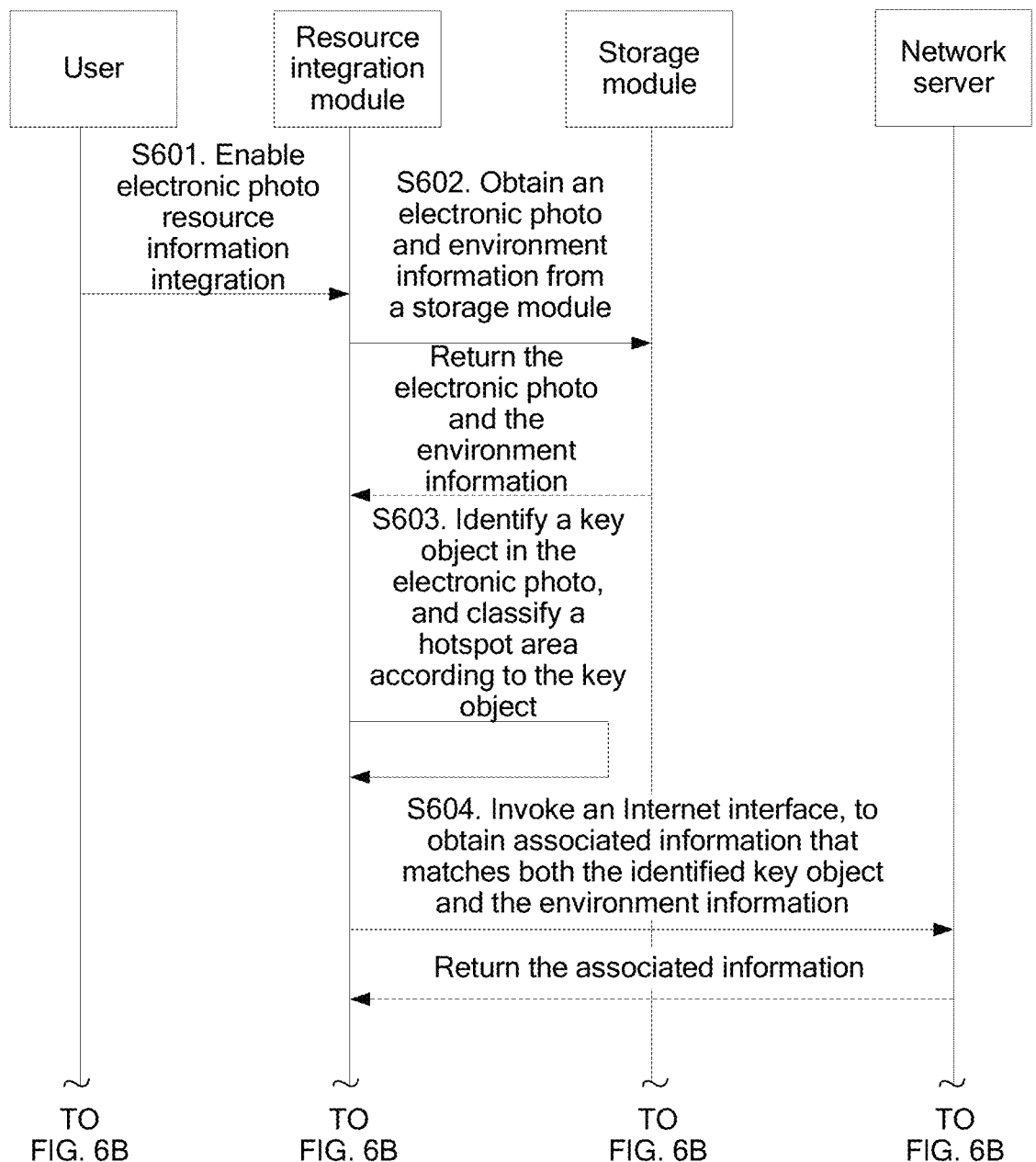
FIG. 6A and FIG. 6B are a sequence diagram of integrating electronic photo resource information according to an embodiment of the present invention.
Figure 6B:
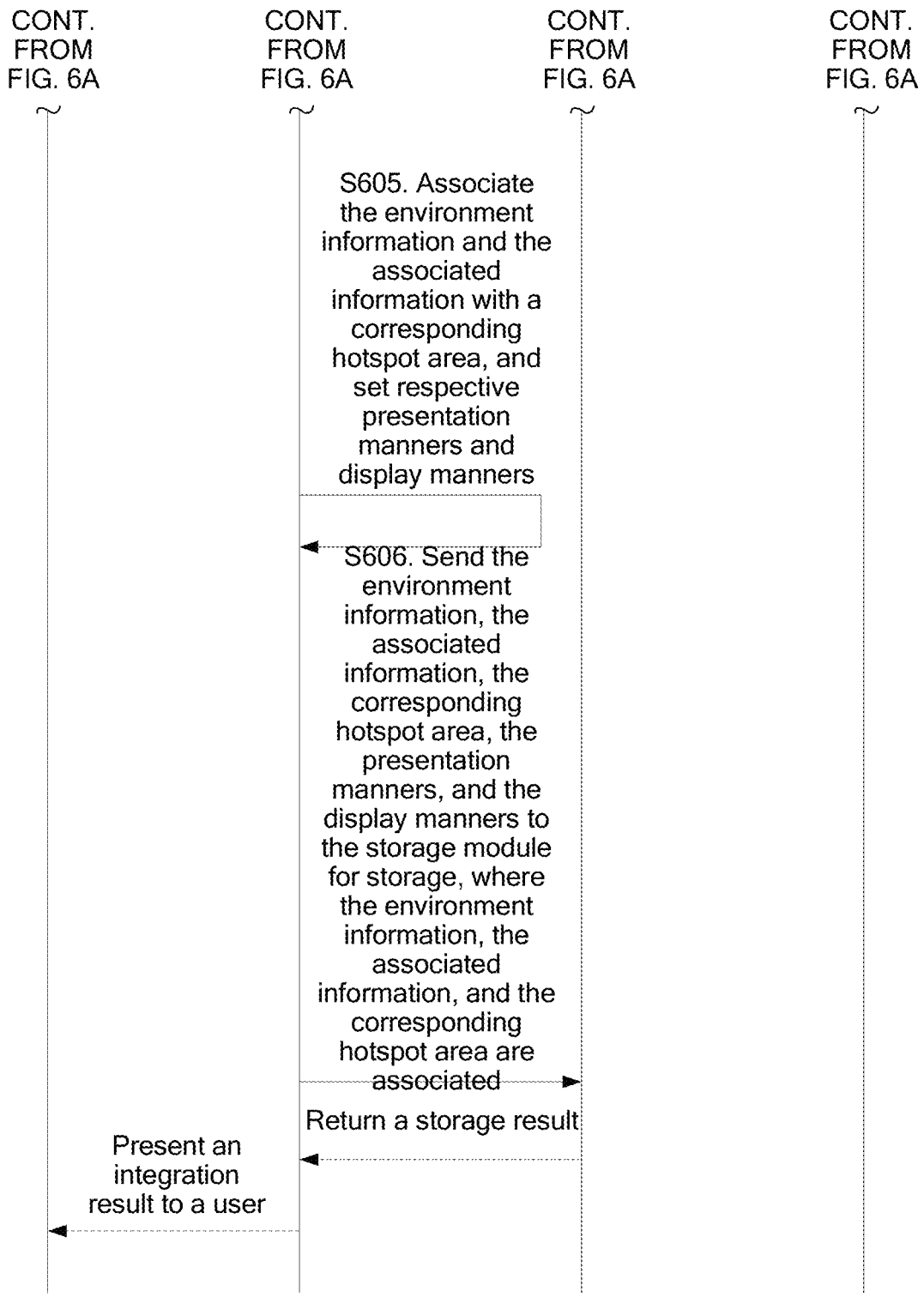

FIG. 6A and FIG. 6B are a sequence diagram of integrating electronic photo resource information, and includes the following steps.

Step 601: A user enables electronic photo resource information integration.

Step 602: A resource integration module obtains an electronic photo and environment information from a storage module.

Step 603: The resource integration module identifies a key object in the electronic photo, and classifies a hotspot area according to the key object.

Step 604: The resource integration module invokes an Internet interface, to obtain associated information that matches both the identified key object and the environment information.

Step 605: The resource integration module associates the environment information and the associated information with a corresponding hotspot area, and sets respective presentation manners and display manners.

The presentation manner may be receiving an instruction for viewing the electronic photo, and/or detecting an instruction for tapping the hotspot area in which the identified key object is located.

The display manner may be presenting the environment information and the associated information around a tapped key object, or may be embedding the environment information and the associated information in the electronic photo for presentation, or may be presenting the environment information and the associated information in a background of a mobile device.

Step 606: The resource integration module sends the environment information, the associated information, the corresponding hotspot area, the presentation manners, and the display manners to the storage module for storage, where the environment information, the associated information, and the corresponding hotspot area are associated.

Optionally, the storage module may return a storage result to the resource integration module after saving the electronic photo, and the resource integration module presents an integration result to the user.

The foregoing resource integration module and storage module are configured inside the mobile device.

Figure 7A:
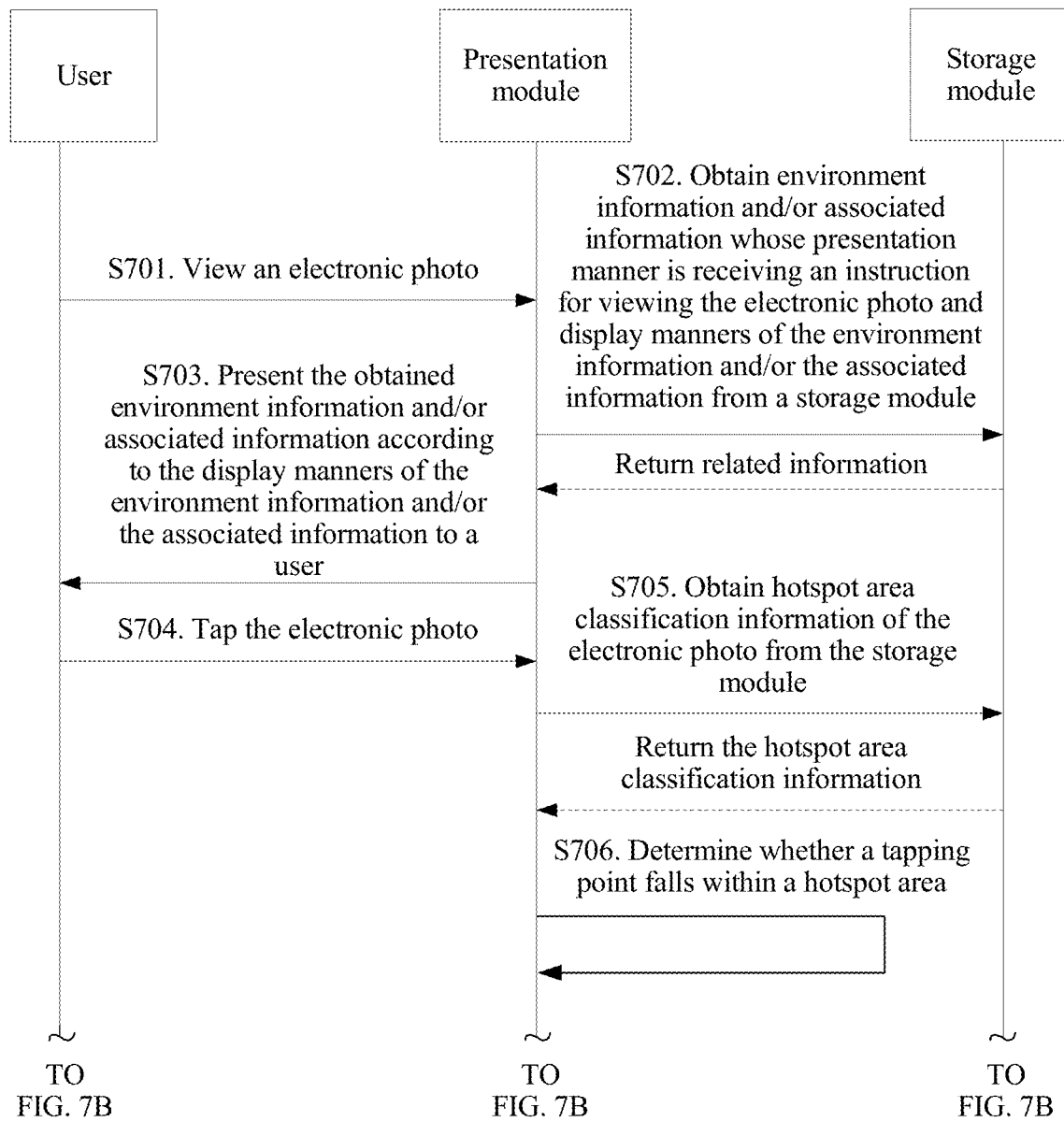
FIG. 7A and FIG. 7B is a sequence diagram of interacting with an electronic photo according to an embodiment of the present invention.
Figure 7B:
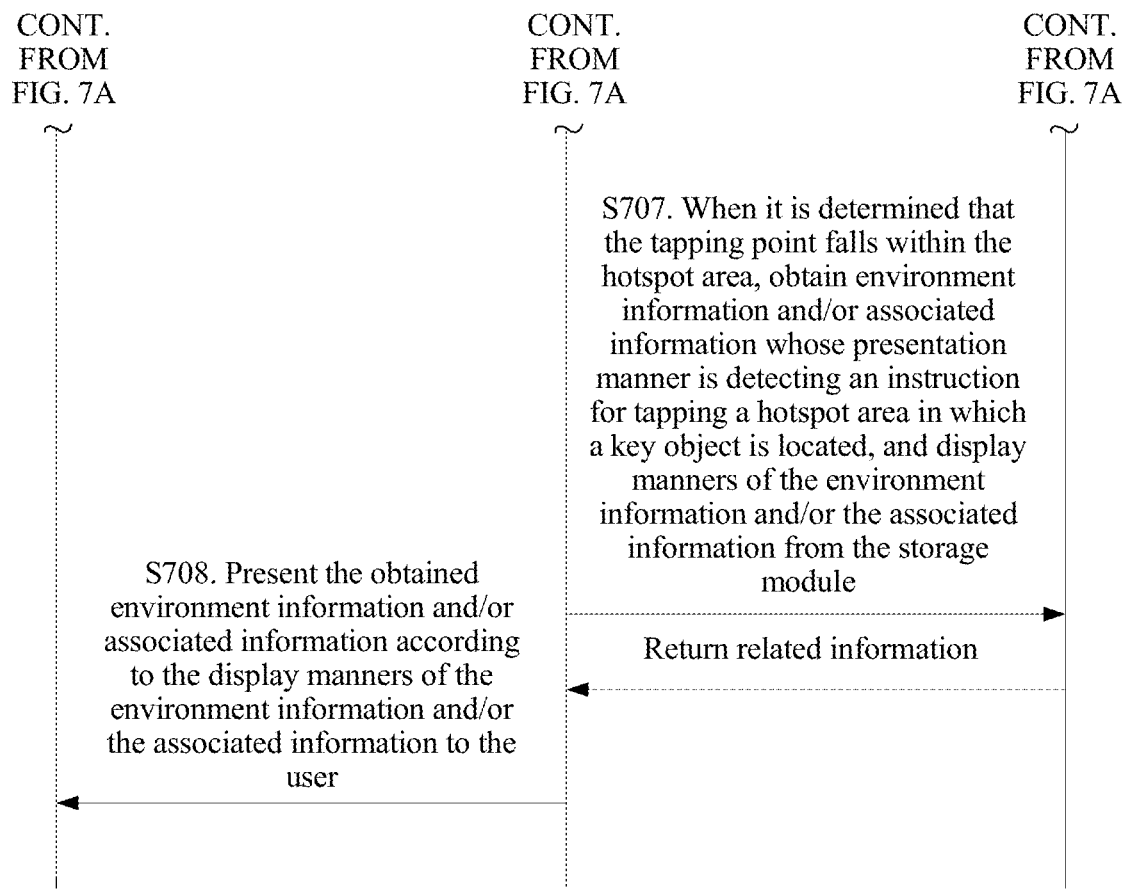

FIG. 7A and FIG. 7B are a sequence diagram of interacting with an electronic photo, and includes the following steps.

Step 701: A user views an electronic photo.

Step 702: A presentation module obtains environment information and/or associated information whose presentation manner is receiving an instruction for viewing the electronic photo, and display manners of the environment information and/or the associated information from a storage module.

Step 703: The presentation module presents the obtained environment information and/or associated information according to the display manners of the environment information and/or the associated information to the user.

Step 704: The user taps the electronic photo.

Step 705: The presentation module obtains hotspot area classification information of the electronic photo from the storage module.

Step 706: The presentation module determines whether the tapping point falls within a hotspot area.

Step 706: When determining that the tapping point falls within the hotspot area, the presentation module obtains environment information and/or associated information whose presentation manner is detecting an instruction for tapping a hotspot area in which a key object is located, and display manners of the environment information and/or the associated information from the storage module.

Step 708: The presentation module presents the obtained environment information and/or associated information according to the display manners of the environment information and/or the associated information to the user.

The foregoing presentation module and storage module are configured inside a mobile device.

Figure 8:
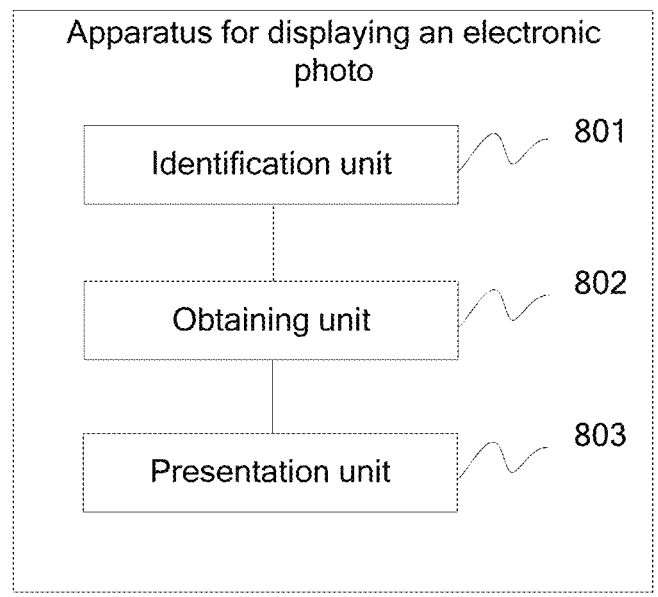
FIG. 8 is a structural diagram of an apparatus for displaying an electronic photo according to an embodiment of the present invention.

Referring to FIG. 8, an embodiment of the present invention provides an apparatus for displaying an electronic photo, to implement the method for displaying an electronic photo shown in FIG. 1. The apparatus includes:

an identification unit 801, configured to identify a key object included in the electronic photo;

an obtaining unit 802, configured to obtain, for at least one time, associated information that matches the identified key object; and a presentation unit 803, configured to present the associated information and the electronic photo when a preset presentation manner is triggered.

Optionally, the obtaining unit 802 is specifically configured to: when a specified period elapses, obtain the associated information that matches the identified key object; or when an instruction used to instruct to obtain the associated information that matches the identified key object is detected, obtain the associated information that matches the identified key object; or when an instruction for viewing the electronic photo is detected, obtain the associated information that matches the identified key object.

The key object includes at least one of the following objects: a face, an animal, a building, or an article.

Optionally, the obtaining unit 802 is specifically configured to: search, for an electronic photo that includes the key object, electronic photos provided by a mobile device; and/or search, for contact information of a contact whose contact profile picture matches the key object, an address book provided by a mobile device; and/or search, based on found contact information and for contact status information that matches the contact information, a contact list in a third-party social application program provided by a mobile device; and/or search, for contact status information corresponding to a contact profile picture that matches the key object, contact profile pictures in a third-party social application program provided by a mobile device; and/or identify key information included in the key object, and search, for a file that matches the key information, files provided by a mobile device; and/or identify key information included in the key object, and search, for information that matches the key information, a third-party unsocial application program provided by a mobile device: and/or identify key information included in the key object, and invoke an Internet interface to search the Internet for information that matches the key information.

A type of the associated information includes at least one of the following types: audio, a video, a picture, a text, an audio link, a video link, a picture link, a text link, an application program link, or a device action. The device action includes at least one of the following: vibration, screen off/on, or flashing.

Optionally, after identifying the key object included in the electronic photo, the identification unit 801 is further configured to: classify an area in which an identified first key object included in the electronic photo is located as a first hotspot area; mark a position of the first hotspot area in the electronic photo, to obtain position information corresponding to the first hotspot area; establish, for the identified first key object, a mapping relationship between the position information of the first hotspot area and associated information that is of the first key object and that is obtained at a current time; and save, in an associative manner, the electronic photo and a mapping relationship that is established for each key object. The first key object is any key object included in the electronic photo.

Correspondingly, the presentation unit 803 is specifically configured to: present the electronic photo; obtain the position information of the first key object when it is detected that the first key object included in the presented electronic photo is tapped; search the stored mapping relationship for the associated information corresponding to the obtained position information; and present the found associated information in a designated position in the electronic photo.

Optionally, when presenting the associated information and the electronic photo, the presentation unit 803 is specifically configured to: present link information of the associated information in a designated position in the electronic photo, and when it is detected that the link information is tapped, set a window, embed the associated information in the window, and present, in the electronic photo, the window in which the associated information is embedded; and/or present link information of the associated information in a designated position in the electronic photo, and when it is detected that the link information is tapped, jump to an application program that provides the associated information; and/or embed the associated information in the electronic photo for presentation; and/or present the associated information in a background of the mobile device.

The preset presentation manner includes one or a combination of the following manners: receiving an instruction for viewing the electronic photo; or detecting an instruction for tapping a hotspot area in which the identified key object is located.

Optionally, before obtaining the associated information that matches the identified key object, the obtaining unit 802 is further configured to obtain environment information of an environment in which the electronic photo is taken.

Optionally, when obtaining the associated information that matches the identified key object, the obtaining unit 802 is specifically configured to obtain the associated information that matches both the identified key object and the environment information.

Optionally, the presentation unit 803 is further configured to present the obtained environment information in the electronic photo.

The environment information includes at least one of the following: time, temperature, humidity, light intensity, weather, ultraviolet rays, a pollution degree, longitude and latitude, a geographical location, a sound, or activity content information in taking the electronic photo.

Figure 9:
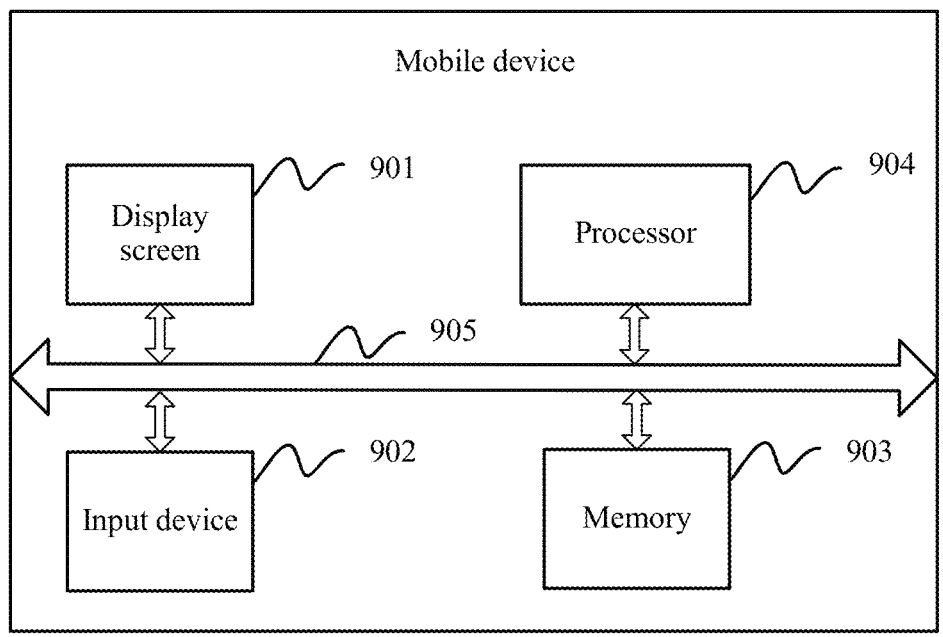
FIG. 9 is a structural diagram of another apparatus for displaying an electronic photo according to another embodiment of the present invention.

Referring to FIG. 9, an embodiment of the present invention further provides a mobile device, and the mobile device includes:

a display screen 901, an input device 902, a memory 903, and a processor 904.

The display screen 901, the input device 902, the memory 903, and the processor 904 are connected to a bus 905. The bus 905 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of denotation, the bus is indicated by using only one thick line in FIG. 9, but it does not mean that there is only one bus or only one type of bus.

The display screen 901 is configured to display an electronic photo and associated information.

The input device 902 is configured to detect an input instruction of a user. Specifically, the input device 902 may be implemented by using a touchscreen, a mouse, a keyboard, or the like. The input instruction herein includes an instruction for viewing or tapping the electronic photo.

The memory 903 is configured to store a group of program code, the electronic photo, and the associated information of the electronic photo. Specifically, the program code includes a computer operation instruction. The memory 903 may include a random access memory (random access memory, RAM for short), or may further include a non-volatile memory (non-volatile memory) such as at least one magnetic disk memory.

Optionally, the memory 903 may be further configured to store a mapping relationship between position information of a hotspot area corresponding to a key object included in the electronic photo and associated information of the key object, and may be further configured to store environment information of an environment in which the electronic photo is taken.

The processor 904 is configured to invoke the program code stored in the memory 903, to perform the following operations:

identifying a key object included in the electronic photo; obtaining, for at least one time, associated information that matches the identified key object; and presenting the associated information and the electronic photo when a preset presentation manner is triggered.

Optionally, when obtaining, for at least one time, the associated information that matches the identified key object, the processor 904 is specifically configured to: when a specified period elapses, obtain the associated information that matches the identified key object; or when an instruction used to instruct to obtain the associated information that matches the identified key object is detected, obtain the associated information that matches the identified key object; or when an instruction for viewing the electronic photo is detected, obtain the associated information that matches the identified key object.

Optionally, the key object includes at least one of the following objects: a face, an animal, a building, or an article.

Optionally, when obtaining the associated information that matches the identified key object, the processor 904 is specifically configured to: search, for an electronic photo that includes the key object, electronic photos provided by a mobile device; and/or search, for contact information of a contact whose contact profile picture matches the key object, an address book provided by a mobile device; and/or search, based on found contact information and for contact status information that matches the contact information, a contact list in a third-party social application program provided by a mobile device; and/or search, for contact status information corresponding to a contact profile picture that matches the key object, contact profile pictures in a third-party social application program provided by a mobile device; and/or identify key information included in the key object, and search, for a file that matches the key information, files provided by a mobile device; and/or identify key information included in the key object, and search, for information that matches the key information, a third-party unsocial application program provided by a mobile device; and/or identify key information included in the key object, and invoke an Internet interface to search the Internet for information that matches the key information.

Optionally, a type of the associated information includes at least one of the following types: audio, a video, a picture, a text, an audio link, a video link, a picture link, a text link, an application program link, or a device action. The device action includes at least one of the following: vibration, screen off/on, or flashing.

Optionally, after identifying the key object included in the electronic photo, the processor 904 is further configured to: classify an area in which an identified first key object included in the electronic photo is located as a first hotspot area; and mark a position of the first hotspot area in the electronic photo, to obtain position information corresponding to the first hotspot area. The first key object is any key object included in the electronic photo; establish, for the identified first key object, a mapping relationship between the position information of the first hotspot area and associated information that is of the first key object and that is obtained at a current time; and save, in an associative manner, the electronic photo and the mapping relationship that is established for the first key object.

Correspondingly, when the presenting the associated information and the electronic photo, the processor 904 is specifically configured to: present the electronic photo; obtain the position information of the first key object when it is detected that the first key object included in the presented electronic photo is tapped search the stored mapping relationship for the associated information corresponding to the obtained position information; and present the found associated information in a designated position in the electronic photo.

Optionally, when presenting the associated information and the electronic photo, the processor 904 is specifically configured to: present link information of the associated information in a designated position in the electronic photo, and when it is detected that the link information is tapped, set a window, embed the associated information in the window, and present, in the electronic photo, the window in which the associated information is embedded, and/or present link information of the associated information in a designated position in the electronic photo, and when it is detected that the link information is tapped, jump to an application program that provides the associated information; and/or embed the associated information in the electronic photo for presentation; and/or present the associated information in a background of the mobile device.

Optionally, the preset presentation manner includes one or a combination of the following manners: receiving an instruction for viewing the electronic photo; or detecting an instruction for tapping a hotspot area in which the identified key object is located.

Optionally, when the presenting the associated information and the electronic photo, the processor 904 is specifically configured to: embed the associated information in the electronic photo for presentation; or present the associated information in a background of the mobile device.

Optionally, the apparatus may further include:
a sensor, configured to record environment information of an environment in which the electronic photo is taken.

Optionally, before obtaining the associated information that matches the identified key object, the processor 904 is further configured to obtain the environment information of the environment in which the electronic photo is taken.

Optionally, when obtaining the associated information that matches the identified key object, the processor 904 is specifically configured to obtain the associated information that matches both the identified key object and the environment information.

Optionally, the processor 904 is further configured to present the obtained environment information in the electronic photo.

Optionally, the environment information includes at least one the following:

time, temperature, humidity, light intensity, weather, ultraviolet rays, a pollution degree, longitude and latitude, a geographical location, a sound, or activity content information in taking the electronic photo.

In addition, an embodiment of the present invention further provides a computer program product used for display an electronic photo, the computer program product includes a computer-readable medium, and the computer-readable medium includes an instruction that can perform an operation step in the method for displaying an electronic photo in any of the foregoing cases.

In conclusion, in the technical solutions provided in the embodiments of the present invention, environment information of an environment in which an electronic photo is taken is associated with the electronic photo, a key object included in the electronic photo is identified, associated information that matches the environment information of the key object is integrated, and the associated information is constantly updated, so that information included in the electronic photo is dynamic and fresh, and an amount of the information included in the electronic photo is increased. In addition, in the embodiments of the present invention, the electronic photo is associated with a social network, so that interaction between the electronic photo and a user is enhanced.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the an can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for displaying an electronic photograph, implemented by a device, comprising:
    identifying a face included in a first electronic photograph captured and stored on the device;
    classifying an area in which a first key object included in the first electronic photograph is located as a first hotspot area;
    marking a position of the first hotspot area in the first electronic photograph to obtain position information corresponding to the first hotspot area;
    establishing, for the first key object, a mapping relationship between the position information of the first hotspot area and associated information of the first key object that is obtained at a current time;
    saving, in an associative manner, the first electronic photograph and the mapping relationship that is established for the first key object;
    searching for a second electronic photograph that includes the face from a plurality of electronic photographs stored in the device, wherein the first electronic photograph is different from the second electronic photograph;
    storing a relationship between the first electronic photograph and the second electronic photograph;
    detecting an instruction for viewing the first electronic photograph;
    obtaining a current mood associated with the face in response to detecting the instruction for viewing the first electronic photograph; and
    simultaneously presenting, based on the relationship, the first electronic photograph, the second electronic photograph, and the current mood associated with the face on a display screen of the device by:
        presenting the first electronic photograph;
        obtaining current position information of a person associated with the face when the first electronic photograph is tapped; and
        presenting the current position information in a designated position in the first electronic photograph.

2. The method of claim 1, further comprising one of:
    searching contact status information corresponding to a contact profile picture that matches the face for contact profile pictures in a third-party social application program;
    identifying key information included in the face and searching files stored in the device for a file that matches the face;
    identifying the key information included in the face and searching information that matches the face for a third-party unsocial application program; or
    identifying the key information included in the face and invoking an Internet interface to search the Internet for information that matches the key information.

3. The method of claim 1, further comprising one of:
    presenting link information of associated information in a designated position in the first electronic photograph, and when the link information is tapped, setting a window, embedding the associated information in the window, and presenting, in the first electronic photograph, the window in which the associated information is embedded;

presenting the link information of the associated information in the designated position in the first electronic photograph, and when the link information is tapped, jumping to an application program that provides the associated information;

embedding the associated information in the first electronic photograph for presentation; or presenting the associated information in a background of the device.

4. The method of claim 1, further comprising detecting an instruction for tapping a hotspot area in which the face is located.

5. The method of claim 1, further comprising:
obtaining environment information of an environment in which the first electronic photograph is taken; and
obtaining associated information that matches both the face and the environment information.

6. The method of claim 5, further comprising presenting the environment information of the environment in which the first electronic photograph is taken in the first electronic photograph.

7. The method of claim 1, further comprising simultaneously displaying an icon representing a manner of contacting a person associated with the face when the first electronic photograph, the second electronic photograph, and the current mood are displayed.

8. The method of claim 1, further comprising:
analyzing data from one or more third-party social applications; and
simultaneously displaying information obtained from analyzing the data from the one or more third-party social applications along with the current mood.

9. The method of claim 1, further comprising:
obtaining a current altitude and a current temperature; and
simultaneously displaying the current altitude and the current temperature along with the current mood.

10. The method of claim 1, further comprising simultaneously displaying a current location of a person associated with the face along with the current mood, wherein the current location of the person is different than a location of the person when the first electronic photograph was taken.

11. A mobile device in communication with a server, comprising:
a display screen configured to display a first electronic photograph and associated information;
an input device configured to detect an input from a user;
a memory configured to store instructions, the first electronic photograph, and the associated information; and
a processor, wherein the input device, the display screen, the memory, and the processor are communicatively coupled to each other using a bus, and wherein the processor is configured to execute the instructions to configure the mobile device to be configured to:
identify a face included in the first electronic photograph and stored on the mobile device;
classify an area in which the face included in the first electronic photograph is located as a first hotspot area;
mark a position of the first hotspot area in the first electronic photograph to obtain position information corresponding to the first hotspot area;
establish, for the face, a mapping relationship between the position information of the first hotspot area and associated information of the face that is obtained at a current time:
save, in an associative manner, the first electronic photograph and the mapping relationship that is established for the face;
search for a second electronic photograph that includes the face from a plurality of electronic photographs stored in the mobile device, wherein the first electronic photograph is different from the second electronic photograph;
store a relationship between the first electronic photograph and the second electronic photograph;
detect an instruction for viewing the first electronic photograph;
obtain a current mood associated with the face in response to detecting the instruction for viewing the first electronic photograph; and
simultaneously present, based on the relationship, the first electronic photograph, the second electronic photograph, and the current mood associated with the face on the display screen of the mobile device by:
presenting the first electronic photograph;
obtaining current position information of a person associated with the face when the first electronic photograph is tapped; and
presenting the current position information in a designated position in the first electronic photograph.

12. The mobile device of claim 11, wherein the processor is further configured to execute the instructions to configure the mobile device to be configured to perform one of:
obtaining the associated information that matches the face when a specified period elapses;
obtaining the associated information that matches the face when an instruction to obtain the associated information that matches the face is detected; or
obtaining the associated information that matches the face when the instruction for viewing the first electronic photograph is detected.

13. The mobile device of claim 11, wherein the processor is further configured to execute the instructions to configure the mobile device to be configured to perform one of:
searching contact status information corresponding to a contact profile picture that matches the face for contact profile pictures in a third-party social application program;
identifying key information included in the face and searching files provided by the mobile device for a file that matches the face;
identifying the key information included in the face and searching a third-party unsocial application program for information that matches the face; or
identifying the key information included in the face and invoking an Internet interface to search the Internet for information that matches the key information.

14. The mobile device of claim 11, wherein the processor is further configured to execute the instructions to configure the mobile device to be configured to perform one of:
presenting link information of associated information in a designated position in the first electronic photograph, and when the link information is tapped, setting a window, embedding the associated information in the window, and presenting, in the first electronic photograph, the window in which the associated information is embedded;

presenting the link information of the associated information in the designated position in the first electronic photograph, and when the link information is tapped, jumping to an application program that provides the associated information;

embedding the associated information in the first electronic photograph for presentation; or presenting the associated information in a background of the mobile device.

15. The mobile device of claim 11, wherein the processor is further configured to execute the instructions to configure the mobile device to be configured to detect an instruction for tapping a hotspot area in which the face is located.

16. The mobile device of claim 11, wherein the mobile device further comprises a sensor configured to record environment information of an environment in which the first electronic photograph is taken, and wherein the processor is further configured to execute the instructions to configure the mobile device to be configured to:

obtain the environment information of the environment in which the first electronic photograph is taken; and obtain associated information that matches both the face and the environment information.

17. The mobile device of claim 16, wherein the processor is further configured to execute the instructions to configure the mobile device to be configured to present the environment information in the first electronic photograph.

18. A non-transitory computer-readable medium configured to store an instruction which when executed by a processor causes a device to execute a method for displaying an electronic photo, wherein the method comprises:

identifying a face included in a first electronic photograph captured and stored on the device;

classifying an area in which a first key object included in the first electronic photograph is located as a first hotspot area;

marking a position of the first hotspot area in the first electronic photograph to obtain position information corresponding to the first hotspot area;

establishing, for the first key object, a mapping relationship between the position information of the first hotspot area and associated information of the first key object that is obtained at a current time;

saving, in an associative manner, the first electronic photograph and the mapping relationship that is established for the first key object searching for a second electronic photograph that includes the face from a plurality of electronic photographs stored in the device, wherein the first electronic photograph is different from the second electronic photograph;

storing a relationship between the first electronic photograph and the second electronic photograph;

detecting an instruction for viewing the first electronic photograph;

obtaining a current mood associated with the face in response to detecting the instruction for viewing the first electronic photograph; and simultaneously presenting, based on the relationship, the first electronic photograph, the second electronic photograph, and the current mood associated with the face on a display screen of the device by:

presenting the first electronic photograph;

obtaining current position information of a person associated with the face when the first electronic photograph is tapped; and presenting the current position information in a designated position in the first electronic photograph.

19. The non-transitory computer-readable medium of claim 18, wherein the method further comprises simultaneously displaying an icon representing a manner of contacting a person associated with the face when the first electronic photograph, the second electronic photograph, and the current mood are displayed.

20. The non-transitory computer-readable medium of claim 18, wherein the method further comprises:

analyzing data from one or more third-party social applications; and simultaneously displaying information obtained from analyzing the data from the one or more third-party social applications along with the current mood.

* * * * *